(12) United States Patent
Jie

(10) Patent No.: US 10,839,587 B2
(45) Date of Patent: Nov. 17, 2020

(54) IMAGE PROCESSING METHODS AND DEVICES FOR MOVING A TARGET OBJECT BY USING A TARGET RIPPLE

(71) Applicant: TENCENT TECHNOLOGY (SHENZHEN) COMPANY LIMITED, Guangdong (CN)

(72) Inventor: Wei Bo Jie, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/152,618

(22) Filed: Oct. 5, 2018

(65) Prior Publication Data

US 2019/0035134 A1 Jan. 31, 2019

Related U.S. Application Data

(63) Continuation of application No. PCT/CN2017/079587, filed on Apr. 6, 2017.

(30) Foreign Application Priority Data

Apr. 6, 2016 (CN) .......................... 2016 1 0209641
Apr. 6, 2016 (CN) .......................... 2016 1 0210562

(51) Int. Cl.
| | | |
|---|---|---|
| G06T 13/60 | (2011.01) | |
| G06T 15/00 | (2011.01) | |
| G06T 13/20 | (2011.01) | |
| A63F 13/25 | (2014.01) | |
| G06T 7/50 | (2017.01) | |
| G06T 1/60 | (2006.01) | |
| G06T 15/20 | (2011.01) | |
| G06T 19/20 | (2011.01) | |

(52) U.S. Cl.
CPC .............. G06T 13/60 (2013.01); A63F 13/25 (2014.09); G06T 1/60 (2013.01); G06T 7/50 (2017.01);

(Continued)

(58) Field of Classification Search
CPC ......... G06T 13/20; G06T 13/60; G06T 15/00; G06T 15/20; G06T 19/20; G06T 2210/21;
(Continued)

(56) References Cited

U.S. PATENT DOCUMENTS 5,877,777 A * 3/1999 Colwell ................. G06T 13/60
345/473
6,650,339 B1 * 11/2003 Silva ..................... G06F 3/0481
345/619
(Continued)

FOREIGN PATENT DOCUMENTS

| CN | 1949273 A | 4/2007 |
| CN | 102663245 A | 9/2012 |

(Continued)

OTHER PUBLICATIONS

International Search Report for PCT/CN2017/079587, dated Jun. 29, 2017.
(Continued)

*Primary Examiner* — Michelle L Sams
(74) *Attorney, Agent, or Firm* — Sughrue Mion, PLLC

(57) ABSTRACT

An image processing method, system, and apparatus are provided. The method includes obtaining an interaction area in a current image frame in which an interaction space of a first object is intersected with a first plane on which a second object is located, a target object in the second object being located in the interaction area. A base image of a water wave animation corresponding to the interaction area is generated, where plural ripples are displayed in the base image. By using a first target ripple of the plural ripples, the target object is moved to a position that is in the current image frame and that corresponds to a ripple position of the first target ripple in the base image, the first target ripple corresponding to the target object.

20 Claims, 8 Drawing Sheets

(52) U.S. Cl.
CPC .............. *G06T 13/20* (2013.01); *G06T 15/00* (2013.01); *G06T 15/005* (2013.01); *G06T 15/20* (2013.01); *G06T 19/20* (2013.01); *G06T 2210/08* (2013.01); *G06T 2210/21* (2013.01); *G06T 2210/24* (2013.01); *G06T 2219/2016* (2013.01)

(58) Field of Classification Search
CPC . G06T 2210/24; A63F 13/52; A63F 2300/663
See application file for complete search history.

(56) References Cited

U.S. PATENT DOCUMENTS

| | | | |
|---|---|---|---|
| 2011/0306416 A1* | 12/2011 | Kelly | G07F 17/32 463/31 |
| 2013/0116046 A1 | 5/2013 | Manton et al. | |
| 2013/0227450 A1* | 8/2013 | Na | G06F 3/048 715/764 |

FOREIGN PATENT DOCUMENTS

| | | | |
|---|---|---|---|
| CN | 102930590 A | | 2/2013 |
| CN | 103679820 A | | 3/2014 |
| CN | 105913471 A | | 8/2016 |
| JP | 2000167237 A | * | 6/2000 |
| KR | 10-2006-0064142 A | | 6/2006 |
| KR | 10-2006-0133671 A | | 12/2006 |

OTHER PUBLICATIONS

Communication dated Sep. 18, 2019 from Korean Patent Office in counterpart KR Application No. 10-2018-7018499.

* cited by examiner

| i-1,j-1 | i-1,j | i-1,j+1 |
|---------|-------|---------|
| i,j-1   | i,j   | i,j+1   |
| i+1,j-1 | i+1,j | i+1,j+1 |

FIG. 5

IMAGE PROCESSING METHODS AND DEVICES FOR MOVING A TARGET OBJECT BY USING A TARGET RIPPLE

CROSS-REFERENCE TO RELATED APPLICATION

This applicant is a continuation of International Application No. PCT/CN2017/079587, filed on Apr. 6, 2017, in the Chinese Patent Office, which claims priority from Chinese Patent Application No. 201610209641.7, entitled "IMAGE PROCESSING METHOD AND APPARATUS," filed on Apr. 6, 2016, and Chinese Patent Application No. 201610210562.8, entitled "VIRTUAL SCENARIO INTERACTION METHOD AND APPARATUS," filed on Apr. 6, 2016, in the Chinese Patent Office, the disclosures of each of which are incorporated by reference herein in their entireties.

BACKGROUND

1. Field

Methods and apparatuses consistent with example embodiments relate to image processing, and specifically, to an image processing method and apparatus.

2. Description of Related Art

In an online game, game players are often concerned about effects of interaction displayed on a main game interface that are between the game players and game scenarios. For example, when a game player walks on a lawn, the game player may have more fun from the game if the lawn achieves swinging and smearing animation effects. Interactive rendering on grass in a virtual scenario of the online game is a very important part of game rendering. A player may feel inanimate if the grass cannot be interacted with the player. When a player walks across the grass or casts a spell, the game player obtains very strong feedback if the grass can achieve realistic interaction (that is, the foregoing swinging and smearing) effects, making the game player believe that this game world can be affected by the game player, thereby increasing the sense of immersion of the player.

For example, in games such as online games: FarCry and Age of Wushu, the grass may achieve an interactive animation effect when a player moves. However, a very small scale of grass achieves an interaction effect, and supports only interaction between several game players. In addition, the effect is very stiff, and cannot present smearing when a player moves on the grass.

Currently, a main method for implementing an interaction effect of the grass in an online game is detecting an intersection between the player and the grass entities by using a central processing unit (CPU), recording, according to a detection result, grass affected during interaction, locking a vertex buffer, and then rendering, one by one, the grass affected during the interaction.

Disadvantages of an existing technical solution are mainly embodied in two aspects: the efficiency is relatively low, and therefore a large scale of interaction cannot be implemented; and in look and feel aspects, swinging animation of the grass is not natural enough, and therefore, a smearing animation effect cannot be simulated when a game player moves.

That the efficiency is relatively low is embodied when there are large quantities of game players and the grass (for example, 200 game players). In this case, the foregoing solution cannot achieve smooth and realistic interactive animation effects of the grass and the game players. For example, it is assumed that a quantity of game players is N, and a quantity of grass is M. In this case, N*M times of detections need to be performed first, and such an operation greatly affects the performance when there are many game players. Each blade of grass affected during interaction requires a corresponding vertex stream, and this definitely causes many video memory overheads. In each frame, the vertex stream of each blade of grass affected during the interaction needs to be locked, to be updated, and this also causes many CPU overheads. Vertex information of each blade of grass affected during the interaction is not completely identical, and therefore, the grass cannot be drawn at a time by using an instant rendering method. Instead, the blades of grass must be drawn one by one, increasing a quantity of draw calls, resulting in deteriorating the performance.

In addition, an image of an existing virtual scenario is implemented by using one interaction image, and the size of the interaction image is very large, such as 2048*2048. The interaction image covers an entire interaction area of the virtual scenario, and corresponding degrees of precision of the entire interaction area are even per unit area. However, because the size of the interaction image is excessively large, and a quantity of pixels needing to be calculated is proportional to the size of the interaction image, a value corresponding to the size of the interaction image is also very large, having a crucial impact on the performance of the virtual scenario. For example, a frame rate dramatically decreases after the virtual scenario is started.

To date, no effective solution has been proposed for the foregoing problems.

SUMMARY

Example embodiments of this application provide an image processing method and apparatus to resolve at least a technical problem in an existing technology that a display effect of a second object is relatively poor when a first object interacts with the second object.

According to example embodiments, there is provided an image processing method. The method includes obtaining an interaction area in a current image frame in which an interaction space of a first object is intersected with a first plane on which a second object is located, a target object in the second object being located in the interaction area. A base image of a water wave animation corresponding to the interaction area is generated, where plural ripples are displayed in the base image. By using a first target ripple of the plural ripples, the target object is moved to a position that is in the current image frame and that corresponds to a ripple position of the first target ripple in the base image, the first target ripple corresponding to the target object.

According to other example embodiments, there is also provided an image processing apparatus and a non-transitory computer readable medium corresponding to the method.

BRIEF DESCRIPTION OF THE DRAWINGS

The accompanying drawings described herein are used to provide further understanding for this application, and constitute a part of this application. Exemplary embodiments of this application and descriptions are used to explain this application and do not constitute any inappropriate limit on this application.

FIG. 5 is a schematic diagram of an optional pixel diffusion according to the first example embodiment of this application.

DETAILED DESCRIPTION

Figure 1:
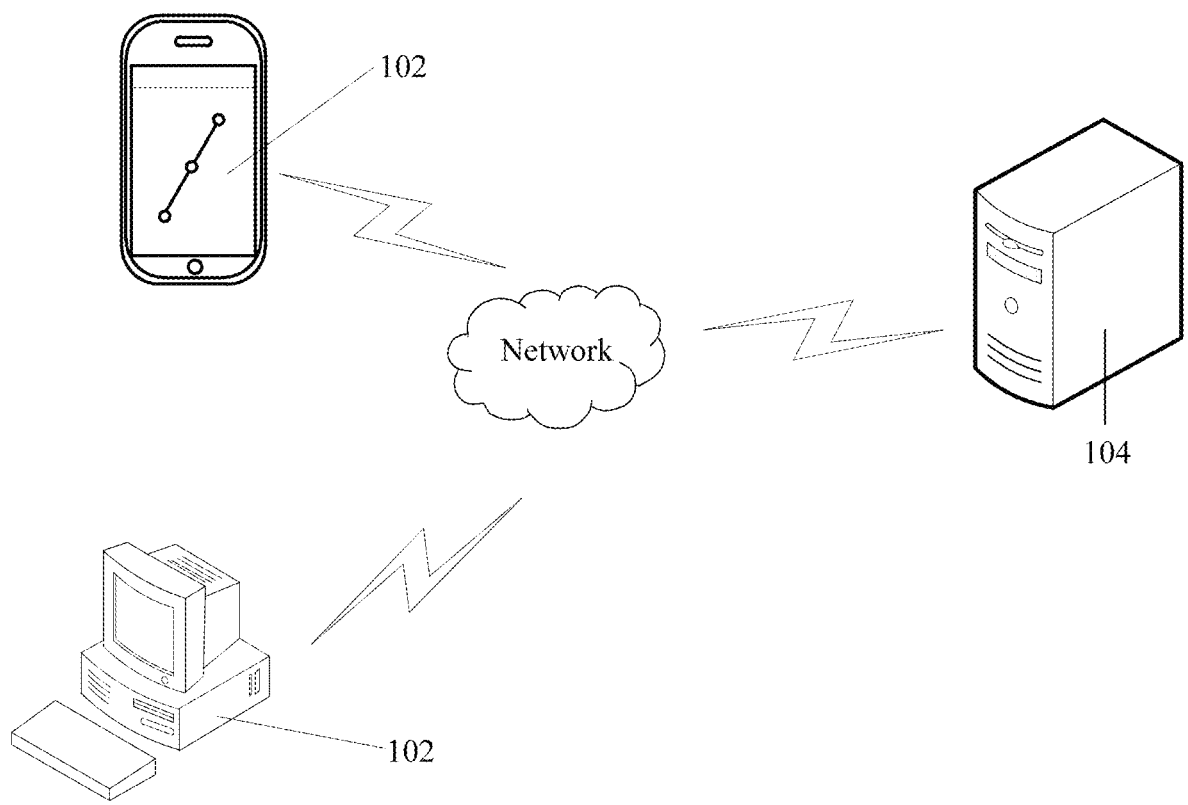
FIG. 1 is an architectural diagram of a hardware environment according to the first example embodiment of this application.

To make the solutions of this application more comprehensible for persons skilled in the art, the following clearly and completely describes the technical solutions in example embodiments of this application with reference to the accompanying drawings in the example embodiments of this application. Apparently, the described example embodiments are some embodiments rather than all the example embodiments of this application. All other embodiments obtained by persons of ordinary skill in the art based on the example embodiments of this application without creative efforts shall fall within the protection scope of this application.

It should be noted that in the specification, claims, and accompanying drawings of this application, the terms "first," "second," and so on are intended to distinguish between similar objects rather than indicating a specific order or sequence. It should be understood that, data used in this way can be interchanged in an appropriate case, so that the example embodiments of this application that are described herein can be implemented in a sequence other than those sequences illustrated or described herein. Moreover, the terms "include," "contain" and any other variants mean to cover the non-exclusive inclusion. For example, a process, method, system, product, or device that includes a list of steps, units, or code is not necessarily limited to those steps, units or code, but may include other steps, units or code not expressly listed or inherent to such a process, method, system, product, or device.

Interpretation of Technical Terms:

GPU, for example on a video card, and whose English full name is graphic processing unit.

Interactive rendering, a player may change the shape and the look and feel of elements by interacting with the elements in a game world, to make the player believe that the game world can be changed or affected by the player.

Vertex buffer, which stores a vertex information stream of a model, including data such as a position, a texture, coordinates, tangents, and/or space vectors.

Draw call, a process that an engine prepares data and notifies a GPU of the data, is referred to as a draw call.

Instant rendering, a GPU completes, at a time, drawing a plurality of model examples in a scenario whose model data is identical.

A water wave animation model, a height image is affected by interaction, and then the height image is attenuated to diffuse around, to generate a realistic water wave animation.

Vertex perturbation, a vertex model is offset by using a texture of a vertex or in a random manner, so that the vertex of the model seems to dynamically change.

According to example embodiments, an image of a water wave animation corresponding to an interaction area is generated when a first object interacts with a second object, and a target object is moved, by using a first target ripple of corresponding to the target object, to a position that is in a current image frame and that corresponds to the ripple position of the first target ripple in a base image, so that an objective of adjusting a position of the target object by using the base image is achieved, implementing a technical effect that a position of the second object may change with the base image of the water wave animation, and resolving a technical problem in an existing technology that a display effect of the second object is relatively poor when the first object interacts with the second object.

According to example embodiments, there is provided interaction images of different levels form remote views and close views of an image in a virtual scenario. The close view of the image can be formed by using a high-precision interaction image, and the remote view of the image can be formed by using a low-precision interaction image, avoiding unnecessary wastes and video memory consumption that are caused due to high precision of an interaction image corresponding to a remote-view interaction area, thereby significantly reducing a quantity of pixels in a real-time full-screen updating operation, obviously reducing video memory overheads, and improving the performance.

According to example embodiments, a smooth transition is performed on degrees of precision between adjacent interaction areas according to degrees of precision of corresponding interaction images, to overcome disadvantages that degrees of precision of the interaction areas are uneven and an edge area in which the interaction areas are intersected with each other have a precision mutation, thereby improving interaction precision.

Embodiment 1

According to example embodiments, there is provided an image processing method.

The method provided in the example embodiment of this application, the image processing method is applicable to a hardware environment, shown in FIG. 1, including a server 104 and a terminal 102. FIG. 1 is a schematic diagram of the hardware environment according to this example embodiment of this application. As shown in FIG. 1, the server 104 is connected to the terminal 102 by using a network. The network includes, but is not limited to, a wide area network, a metropolitan area network, and a local area network. The terminal 102 may include, but is not limited to, a computer, a mobile phone, a tablet computer, and the like.

Figure 2:
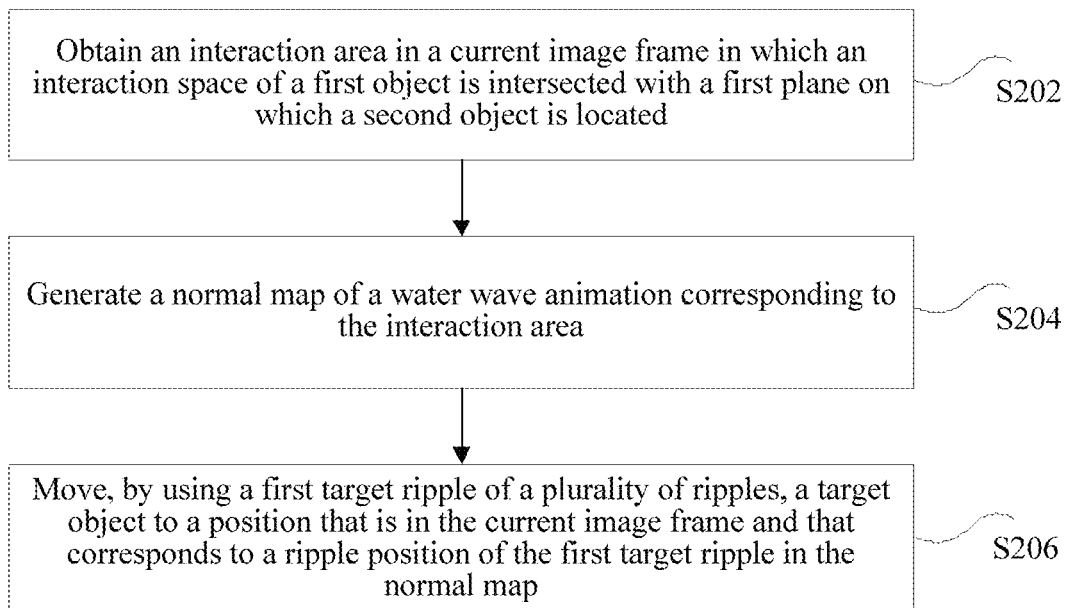
FIG. 2 is a flowchart of an image processing method according to the first example embodiment of this application.

FIG. 2 is a flowchart of an image processing method according to an example embodiment of this application. As shown in FIG. 2, the image processing method includes the following steps:

In Step S202, obtain an interaction area in a current image frame in which an interaction space of a first object is intersected with a first plane on which a second object is located, a target object in the second object being located in the interaction area.

For example, the first object may include, but is not limited to a game player of a game, a game skill, a game special effect, or the like, and the second object may be an object whose modality is easily affected by the first object such as the grass, a flower, fog or the like. The first plane is a plane on which the second object is located, such as the ground in which the grass is located.

Figure 3:
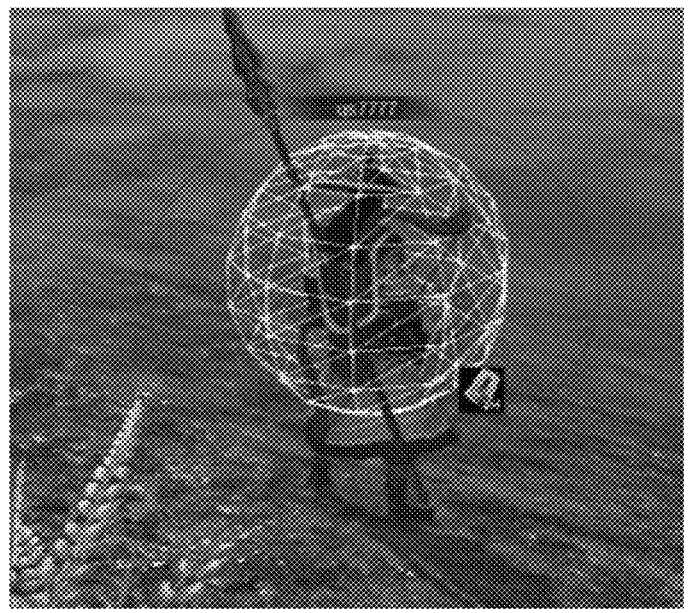
FIG. 3 is a schematic diagram of an optional interaction space of a game player according to the first example embodiment of this application.

In an online game, an actor (the first object) performing interaction needs to be bound to at least one interaction node, and the interaction node may generate interaction spaces in different sizes or ranges according to different configurations. As shown in FIG. 3, a white ball shown in FIG. 3 is an interaction space.

Interaction in an image in a virtual scenario can be triggered by using an interaction node, and the further impact that caused by the interaction is updated according to real-time updating of the image in the virtual scenario. The impact that caused by the interaction is the impact of an action triggering by the interaction node on an element nearby. An interaction point that is generated when the interaction node is intersected with an element of the image in the virtual scenario is obtained according to configuration information corresponding to the interaction node. Each interaction node has corresponding configuration information, and the configuration information is used for controlling generated interaction, for example, controlling an interaction range. In an example, the interaction node may be bound to a point, which is determined, of a ball. Through the ball, the interaction node is intersected with another element in the virtual scenario, to obtain, on such a basis, impact on the another element that is caused when the interaction node interacts with the another element. When a motion is detected in an image that is triggered by the interaction node, an interaction point is generated when the moving interaction node is intersected by an element, so the impact of the triggered interaction on another element is precisely updated by using the interaction point.

An interaction node is added by default to each of a player and a non-play character (NPC), and the interaction node is configured according to requirements of a game skill and a game special effect. An interaction area is formed when the interaction space of the first object is intersected with the ground in which the grass is located. The interaction space and the first plane are intersected to obtain a circular section, when the interaction space is a ball.

In Step S204, generate a base image of a water wave animation corresponding to the interaction area, a plurality of ripples being displayed in the base image.

A base image of a water wave animation corresponding to a circular section may be generated according to the interaction area (for example, the circular section), and the base image includes a plurality of ripples (that is, water ripples). The generated base image of the water wave animation may be applied to the circular section, and a quantity of water ripples in the generated base image is a quantity of water ripples to be displayed by the circular section in the current image frame.

In Step S206, move, by using a first target ripple of the plurality of ripples, a target object to a position that is in the current image frame corresponds to a ripple position of the first target ripple in the base image, the first target ripple corresponding to the target object.

The target object is an object moving under the impact of the base image, for example, may be some or all of the grass in the interaction area. For example, there are two circles of grass in the interaction area, and a first circle of grass is perturbed by the first target ripple to move to a corresponding position in the current image frame. The corresponding position may be determined by using the ripple position of the first target ripple in the base image. The second circle of grass is not perturbed by the first target ripple in the base image to move to the position to which the first circle of grass is moved. The first circle of grass is the target object, and the first target ripple is a ripple for perturbing the first circle of grass among the plurality of ripples in the base image.

In this example embodiment of this application, the base image of the water wave animation corresponding to the interaction area is generated when the first object interacts with the second object, and the target object is moved, by using the first target ripple of corresponding to the target object, to the position that is in the current image frame and that corresponds to the ripple position of the first target ripple in the base image, so that an objective of adjusting a position of the target object by using the base image is achieved, implementing a technical effect that a position of the second object may change with the base image of the water wave animation, and resolving a technical problem in an existing technology that a display effect of the second object is relatively poor when the first object interacts with the second object.

After each image frame is adjusted by using a base image corresponding to the image frame, an animation effect may be displayed when a plurality of adjusted image frames is continuously displayed. For example, in a game, a swinging effect of grass perturbed by a game character is displayed when the game character walks across the grass, and a smearing effect similar to diffusing a water ripple in a direction may be formed when the game character moves.

According to an exemplary embodiment, the image processing method may be applied to an online game such as The Magic Blade, and the target object in the interaction area is rendered by using a game engine of The Magic Blade. For example, a game character walks in any virtual scenario of The Magic Blade. The virtual scenario is a lawn. An interaction area is obtained through an interaction space (for example, the ball shown in FIG. 3) of the game character is intersected with the ground (the first plane) in which the lawn is located when the game character walks on the lawn. An online game client of The Magic Blade generates an image of a water wave animation corresponding to the interaction area, so that grass corresponding to a first target ripple in the interaction area is moved to a corresponding position in a current image frame by using the first target ripple of the plurality of ripples. The corresponding position is a position corresponding to a ripple position of the first target ripple in the base image. A swinging effect of the grass formed when the character walks across the lawn or a smearing effect formed when the character walks across the lawn may be displayed on a display interface of the online game when a continuous animation is formed by a plurality of image frames, so that interaction between the game player and the virtual scenario increases, and the simulated virtual scenario is more realistic, thereby increasing fun of the game.

It may be noted that in this exemplary embodiment of this application, the perturbation of the target object by the first object is implemented by a Vertex Shader in a video card (GPU) by using the base image of the water wave animation, but not implemented by a CPU, improving display data processing efficiency.

For description and illustration purposes, a game character is used as the first object, and the grass is used as the target object in the following example embodiments. According to an exemplary embodiment, the step of moving, by using a first target ripple of the plurality of ripples, the target object to a position that is in the current image frame and that corresponds to a ripple position of the first target ripple in the generated image includes adjusting the target object from a first modality to a second modality according to the base image of the water wave animation, where a vertex of the target object in the second modality is located at the position that is in the current image frame and that corresponds to the ripple position of the first target ripple in the base image.

In this exemplary embodiment of this application, interaction between the first object and the target object means that an action of the first object affects a modality of the target object. For example, the game character interacts with the grass when walking on a lawn, and the interaction causes a modality change to the grass. The grass swings to the front, rear, left, or right, or becomes higher or lower. For example, the grass on two sides of the game character changes from being bent (in the second modality) from being upright (in the first modality), when the game character walks on the lawn. That is, the grass is adjusted from the first modality to the second modality. It may be noted that the interaction between the first object and the target object is not necessarily performed with an object with which the first object comes into contact, because a modality of grass nearby is affected even if the game character does not come into contact with the grass nearby when walking on the lawn.

Continuously changed ripples appear on a water surface when the game character walks on water or comes into contact with water. It may be conceived by a game designer that a change of the ripples on the water surface has a correlation with a change of the modality of the grass when the game character walks on or passes through the lawn. Therefore, in this exemplary embodiment of this application, the target object that the first object interacts with may be perturbed by using the base image of the water wave animation, so that the target object is adjusted from the first modality to the second modality, and the target object achieves an effect similar to a dynamic change of water ripples.

According to an exemplary embodiment of this application, the adjusting the target object from a first modality to a second modality according to the base image of the water wave animation is: obtaining value ranges of a first component and a second component of the plurality of ripples in the base image, where the first component is a component in a direction of an X-axis of the base image, and the second component is a component in a direction of a Y-axis of the base image; obtaining a third component of the target object in a direction of a Z-axis of the base image; determining, according to the first component and the second component, a first offset distance and a first offset direction of vertex coordinates of the target object on a plane on which the X-axis and the Y-axis are located, and determining a second offset distance and a second offset direction of the target object on the Z-axis according to the third component, where the first offset distance falls within the value range; and controlling the vertex coordinates of the target object to be offset by the first offset distance in the first offset direction and to be offset by the second offset distance in the second offset direction.

In this exemplary embodiment of this application, the vertex of the target object may be perturbed by using related map information of the base image of the water wave animation generated by the video card (GPU), so that the target object is changed from the first modality to the second modality. A value range of a component (that is, the first component) and a value range of a component (that is, the second component) of the plurality of ripples included in the base image in the direction of the X-axis and in the direction of the Y-axis may be first obtained, and a projection height (that is, the third component) of the target object in the direction of the Z-axis is obtained. Then, the first offset distance and the first offset direction on the plane on which the X-axis and the Y-axis are located are determined based on the component in the direction of the X-axis and the component in the direction of the Y-axis. That is, whether the target object is offset to the left or right and the front or the rear, and a distance offset to the left or the right and a distance offset to the front or the rear are determined, and a projection height of each target object on the Z-axis is determined, to determine the second offset distance and the second offset direction of the target object on the Z-axis. It indicates that the base image causes relatively small perturbation to the target object in response to the target object having a relatively small projection height on the Z-axis. That is, the first offset distance and the second offset distance of the target object is relatively small and the target object has relatively small offset amplitude. It indicates that the base image causes relatively large perturbation to the target object in response to the target object having a relatively large projection height on the Z-axis. That is, the first offset distance and the second offset distance of the target object are relatively large and the target object has relatively large offset amplitude. It may be understood that the target object is easily affected by an environment to dramatically swing when the target object is relatively long, and it is difficult for the target object to be affected by the environment to dramatically swing when the target object is short. In an exemplary embodiment of this application, by using the foregoing method, the target object is adjusted from the first modality to the second modality, so that a dynamic effect that the target object is offset as the first object moves may be displayed more realistically.

After perturbation values (that is, the first offset distance, the second offset distance, the first offset direction, and the second offset direction) of the target object are determined, the vertex coordinates of the target object are controlled to be offset by the first offset distance in the first offset direction, and to be offset by the second offset distance in the second offset direction. When a plurality of image frame is continuously displayed on an online game interface, because the water wave animation have an animation attribute, the target object may also have an animation effect similar to that of the water wave animation when the target object is perturbed by using the base image of the water wave animation, so that an effect of swinging by the target object when perturbed by the first object may be displayed more realistically, and a smearing effect formed when the target object is passed through by the first object can be displayed on the game interface.

It may be noted that the value range of the first component may be $[-1, 1]$, and the value range of the second component may also be $[-1, 1]$. The value ranges of the first component and the second component are set to $[-1, 1]$, to ensure that the target object can swing to the left, right, front, and rear.

Optionally, the obtaining value ranges of a first component and a second component of the plurality of ripples in the base image is: obtaining a maximum value and a minimum value of a ripple at an outermost layer of the plurality of ripples in the base image in the direction of the X-axis, and a maximum value and a minimum value of the ripple at the outermost layer in the direction of the Y-axis; adjusting coordinates of each of the plurality of ripples on the X-axis and the Y-axis, so that the maximum value and the minimum value in the direction of the X-axis are preset values, and the maximum value and the minimum value in the direction of the Y-axis are the preset values; and determining a range indicated by the preset values, as the value range.

It may be learned from the foregoing descriptions, that value range of the first component may be [−1, 1], and the value range of the second component may also be [−1, 1]. Specifically, a method for setting the value ranges of the first component and the second component to [−1, 1] may be: first obtaining maximum values and minimum values of the ripple at the outermost layer in the base image in the direction of the X-axis and in the direction of the Y-axis; the base image of the water wave animation; then adjusting values of coordinates of each ripple on the X-axis and the Y-axis, so that a value of the maximum value of each ripple on the X-axis is not greater than a preset value (for example, a value of 1), a value of the minimum value of each ripple on the X-axis is not less than a preset value (for example, a value of −1), a value of the maximum value of each ripple on the Y-axis is not greater than a preset value (for example, a value of 1), and a value of the minimum value of each ripple on the Y-axis is not less than a preset value (for example, a value of −1).

When a plurality of image frames is continuously displayed on the game interface, because the generated water wave animation have an animation feature, an animation effect similar to the water wave animation is generated if the base image of the generated water wave animation is used to drive the vertex coordinates of the target object, so that a game simulation effect is more realistic, and a swinging effect of the target object when perturbed by the first object and a smearing effect of the target object formed when the first object moves can be realistically displayed.

It may be noted that in the online game, when a plurality of game characters or special effects (corresponding the first object) or the like interacts with the grass (the target object), the grass perturbed by the plurality of game characters or special effects may be processed by means of instant rendering by using the method provided in this application, and at the same time, the grass perturbed by the plurality of game characters or special effects is adjusted from the first modality to the second modality. The method provided in this application may support simultaneous interaction between a plurality of players (for example, 200 players) and the grass, and at the same time, complete modality processing on the grass interacting with the plurality of players. In addition, in this exemplary embodiment of this application, all the target objects in the virtual scenario use a same vertex buffer, and the vertex buffer records information such as vertex coordinates of each target object or position information of each target object.

Optionally, the generating a base image of a water wave animation corresponding to the interaction area includes: determining, based on a water wave animation height image of an image frame before a first image frame corresponding to the current image frame, a water level of a water wave animation height image of the first image frame, where the first image frame is an image frame of the water wave animation, and the water level is a highest water level among the plurality of ripples in the water wave animation height image of the first image frame; generating a water wave animation height image of the current image frame according to the water level; and generating the base image of the water wave animation based on the water wave animation height image of the current image frame. In an example, height data is carried by using a height image, and a corresponding format may be RGBA16f.

In this exemplary embodiment of this application, the base image of the water wave animation is generated by using a water wave interaction algorithm, and then the target object is adjusted from the first modality to the second modality by using the generated image of the water wave animation. The water wave interaction algorithm is implemented by using the GPU. Implementing of the water wave interaction algorithm by using the GPU can improve water wave interaction efficiency, and is more direct, avoiding low interaction efficiency caused by massive calculation by the CPU.

The water wave interaction algorithm may be divided into four steps, which are: Step 1. Copy a water wave animation height image of a previous image frame, and use the height image as an initial height of a water wave height image of a first image frame; Step 2. Generate height data of the water wave height image of the first image frame based on an interaction node; Step 3. Perform diffusion and attenuation; and Step 4. Calculate abase image. The following describes step 1 to step 4 in detail.

Step 1: Make a full-screen copy of the water wave animation height image of the previous image frame before the first image frame, to a water wave animation height image of the first image frame, as an initial height of the water wave animation height image of the first image frame, where a quantity of ripples in a water wave animation of the first image frame corresponds to a quantity of ripples in a base image of a water wave animation of a current image frame.

Figure 4:
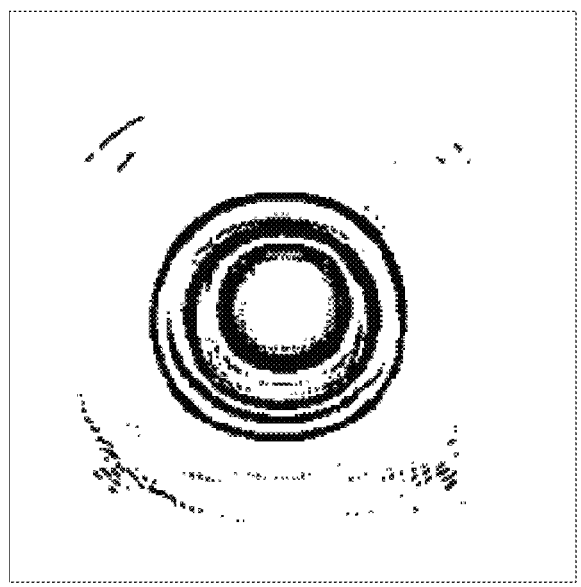
FIG. 4 is a schematic diagram of an optional water wave height image of a first image frame according to the first example embodiment of this application.

Step 2: Use a first object (for example, a game character, a skill, a special effect, or the like) as an interaction node, and adjust a water level of the first image frame based on a value of a configuration parameter of the interaction node, so that water level data of the first image frame is generated. Further, the water wave animation height image of the first image frame may be obtained based on the water level. As shown in FIG. 4, FIG. 4 is a water wave animation height image of a first image frame. The configuration parameter may be set to a default value, or may be set by technical personnel.

Step 3. Diffuse a second target ripple by using the second target ripple whose water level is the water level as a center, to obtain a plurality of diffused ripples, where heights of the plurality of diffused ripples gradually decrease from the center to the outside. The water level is a highest water level among the plurality of ripples in the water wave animation height image of the first image frame. When water ripples in the water wave animation are diffuse, each of them is diffuse from a water ripple (that is, the second target ripple) whose water level is the highest water level, and heights of the plurality of ripples gradually decrease from the water ripple (that is, the second target ripple) whose water level is the highest water level to the outside.

Figure 5:
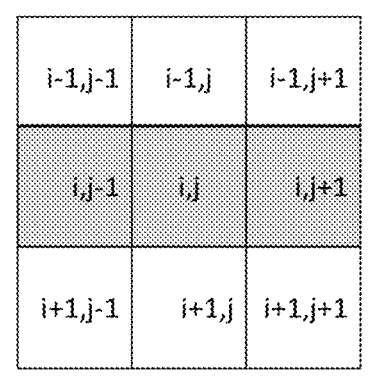

It may be noted that, the diffusing a second target ripple may be: diffusing each pixel in the second target ripple to neighborhood pixels. For example, a diffusion distribution is shown in FIG. 5, (i, j) represents a pixel to be processed currently, and diffusion is performed from the pixel point to surrounding pixels, such as pixels of (i−1, j) and (i+1, j).

In this exemplary embodiment of this application, a height of a pixel (i, j) in the first image frame may be calculated by using the following formula, and the pixel (i, j) is any pixel point in the first image frame:

$$H_{(i,j)}=(H_{(i-1,j-1)}+H_{(i+1,j+1)}+H_{(i-1,j)}+H_{(i-1,j)}+H_{(i,j+1)})/8-H'_{(i,j)}$$

where $H'_{(i,j)}$ is a height of a pixel (i, j) in the image frame before the first image frame, $H_{(i,j)}$ is the height of the pixel (i, j) in the first image frame, $H_{(i-1,j-1)}$ is a height of a pixel (i-1, j-1) in the first image frame, $H_{(i-1,j+1)}$ is a height of a pixel (i-1, j+1) in the first image frame, $H_{(i+1,j+1)}$ is a height of a pixel (i+1, j+1) in the first image frame, $H_{(i-1,j)}$ is a height of a pixel (i-1, j) in the first image frame, $H_{(i+1,j)}$ is a height of a pixel (i+1, j) in the first image frame, and $H_{(i,j+1)}$ is a height of a pixel (i, j+1) in the first image frame.

After obtaining the plurality of diffused ripples by using the foregoing method, the heights of the plurality of diffused ripples may gradually decrease from the center to the outside. That is, a height of each ripple gradually decreases from the center to the outside.

Figure 6:
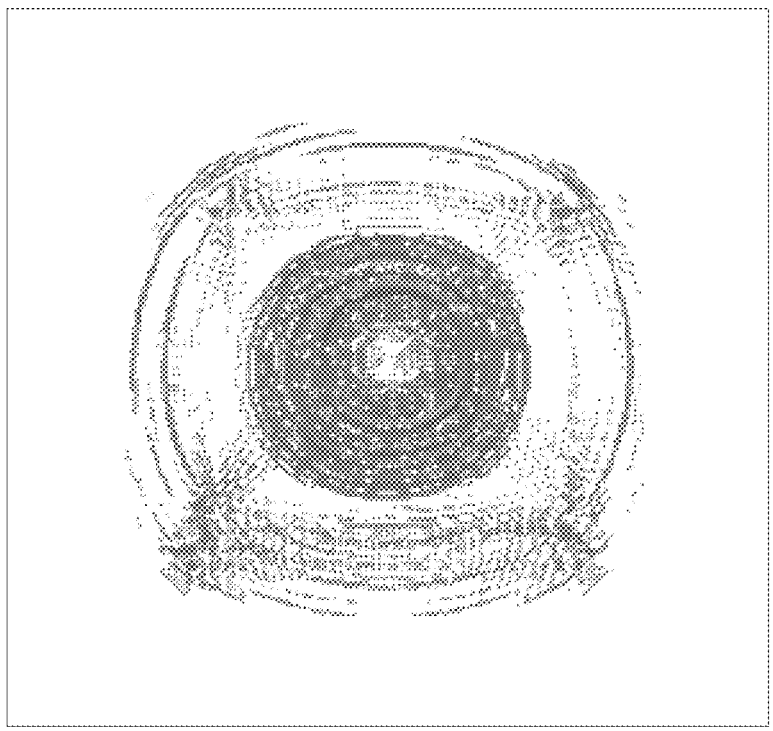
FIG. 6 is a schematic diagram of an optional base image of a water wave height image of a first image frame according to the first example embodiment of this application.

Step 4: Generate a base image according to an attenuated water wave animation height image of the first image frame. The base image and a normal of a water surface may be mixed and then applied to the water surface, to generate a realistic water wave animation. As shown in FIG. 6, FIG. 6 is a base image of a water wave animation of a first image frame. In FIG. 6, obvious water ripples may be seen. If a plurality of image frames is continuously played, an animation feature of a water wave can be implemented.

For example, a game designer sets a range of interaction between game characters, skills, special effects, or the like and grass to 30 m, and sets pixels to 256×256. The game designer conducts a test by using a video card whose type is NV GTX 560Ti, and tests a processing rate when 200 game characters interact with the grass. It may be learned from the test that when 200 characters interact with the grass, it takes less than 0.2 ms in total to obtain an animation effect of the grass. This can rapidly implement interactive rendering of the grass and the game characters, skills or special effects, and a large scale of interaction can be implemented.

The image processing method provided in this application may be based on the GPU. In each image frame, interaction information is used as a water wave height image for being rendered to a map, and a water wave animation height image is attenuated and then diffused to a surrounding area, to generate a corresponding base image. The base image is accessed by using a vertex shader of a target object, and a vertex position of the target object is perturbed by using an x component and a y component of the base image. Because generated water waves have an animation feature, a corresponding animation is also generated if the water waves are used to drive a vertex of the target object. The animation achieves a high sense of vision, and is very excellent in simulating a swinging animation of the target object and smearing formed when a player moves.

According to example embodiments, the imaging processor method may further includes: dividing, according to distances between interaction areas and a viewpoint, the interaction area into interaction areas of different levels, so that interaction images corresponding to the interaction areas of different levels have different degrees of precision. For example, the interaction area is divided into a close-view interaction area and a remote-view interaction area, and interaction images corresponding to the close-view interaction area and the remote-view interaction area have different degrees of precision because distances to a viewpoint are different. The close-view interaction area uses a high-precision interaction image, and the remote-view interaction area uses a relatively low-precision interaction image.

Herein, a plurality of interaction areas is distributed in the image of the virtual scenario, and each interaction area has a corresponding interaction image (for example, a height image and/or a base image). Relative to a viewpoint, that is, a camera for photographing image content, a closer interaction area forms a close view of the image, and a farther interaction area forms a remote view of the image. A distance threshold is preset. An interaction area whose distance to the viewpoint is less than the distance threshold is considered as a close view of the image, and an interaction area whose distance to the viewpoint is greater than the distance threshold is considered as a remote view of the image. Herein, the close view requires an interaction image having a very high degree of precision, and the remote view does not require, due to perceptivity, an interaction image having a very high degree of precision. Therefore, interaction images of different levels form remote views and close views of the image in the virtual scenario, so that the close view of the image can be formed by using a high-precision interaction image, and the remote view of the image can be formed by using a low-precision interaction image, avoiding unnecessary wastes and video memory consumption that are caused due to high precision of an interaction image corresponding to a remote-view interaction area, thereby significantly reducing a quantity of pixels in a real-time full-screen updating operation, obviously reducing video memory overheads, and improving the performance.

According to example embodiments, the imaging process method may further include: loading, to a first interaction buffer, updated height data carried in the water wave animation height image, where height data corresponding to the interaction areas of different levels is stored on different channels of the first interaction buffer. For example, height data corresponding to the close-view interaction area is stored on red and green channels of the first interaction buffer, and height data corresponding to the remote-view interaction area is stored on blue and Alpha channels of the first interaction buffer. In this way, the height data is classified and stored, to help improve a subsequent operation speed, and reduce performance overheads. According to an aspect of this application, when a height attenuation and diffusion operation is performed, height data stored on different channels of the first interaction buffer may be separately calculated. For example, the height data stored on the red and green channels and the height data stored in the blue and Alpha channels may be separately calculated, thereby fully using the system performance and dramatically reducing system overheads.

According to another aspect of this application, after information is generated according to the height data, the method may further include: loading the normal information to a second interaction buffer different from the first interaction buffer, where normal information corresponding to the interaction areas of different levels is stored on different channels of the second interaction buffer. For example, normal information corresponding to the close-view interaction area is stored on red and green channels of the second interaction buffer, and normal information corresponding to the remote-view interaction area is stored on blue and Alpha channels.

Rendering of data in the virtual scenario includes rendering of the height data and normal updating, to obtain an image of a virtual scenario that matches currently triggered interaction and has a realistic reflection effect.

According to an aspect of this application, the method may further include: outputting, based on the height data, a height image matching the interaction area of each level, and rendering the current image frame by using the height image. That is rendering the height image to the virtual scenario.

The height data is output in a preset format, to obtain the height image matching the interaction area of each level. Each height image is rendered to the virtual scenario, to implement real-time height updating of each pixel. In an example, the height data is output as a height image in an RGBA16F format.

According to another aspect of this application, the base image is output according to the normal information, and the base image and a normal of the virtual scenario are mixed and then applied to the virtual scenario, to obtain an image presented in the virtual scenario and updated in real time. For the normal information, the generated image may also be correspondingly output in a preset format. In a preferred embodiment, the base image carries the normal information in an RGBA format.

For example, during water interaction, the base image and a normal of a water surface are mixed and then applied to the water surface, to achieve a realistic water wave effect.

According to another aspect of example embodiments, the imaging processor method may further includes: performing a smooth transition on degrees of precision between adjacent interaction areas in the interaction areas of different levels according to the degrees of precision of the corresponding interaction images.

Herein, the image of the virtual scenario is formed by using a plurality of interaction images. Therefore, the image includes a plurality of interaction areas, and each interaction area corresponds to one interaction image. In the image presented in the virtual scenario, the interaction images have different degrees of precision. Consequently, a smooth transition needs to be performed on degrees of precision between adjacent interaction areas, to overcome disadvantages that the degrees of precision between the interaction areas are uneven, and an edge area in which the interaction areas are intersected with each other have a precision mutation, thereby improving interaction precision. In an embodiment, the smooth transition between the adjacent interaction areas may be implemented by means of linear interpolation between the adjacent interaction areas.

In the process described above, a plurality of interaction maps is used to enable the image of the virtual scenario to have a plurality of degrees of precision, to successfully reduce the size of the interaction map while improving a degree of precision of the interaction map of the close-view interaction area, so that degrees of precision of the interaction maps are fully used, thereby reducing performance overheads, and increasing an interaction range.

In an example of implementing water interaction by using the foregoing process, existing water interaction has a very small interaction scale, and supports interaction between only several players, having very low efficiency. A main reason is that a used interaction map has a very large size, and this has crucial impact on the performance. However, by using the foregoing process, the performance and quality of the water interaction are improved. A plurality of small sized interaction maps is used that improves the imaging performance. Although the size of the interaction map reduces, the quality of the interaction map is improved. The interaction maps are divided into different levels according to distances, and three-dimensional rendering generally uses perspective projection. Therefore, a close view keeps a high degree of precision, and a degree of precision of a remote view may be reduced, thereby correspondingly improving the interaction range. For example, an interaction range covered by two levels is far greater than an interaction range corresponding to only one interaction map.

In addition, the size of the interaction map of the existing virtual scenario is 1024*1024, and after interaction maps of two levels are used, the size of each interaction map is 512*512. In this way, a degree of precision of a provided close view is displayed. For a video memory, during interaction in the existing virtual scenario interaction, the size of two needed interaction buffers is 1024*1024, and occupies a video memory of 12 mb. After the interaction maps of two levels are used, the size of the two interaction buffers is 512*512, and occupies a video memory of 5.2 mb, reducing video memory overheads by a half. The performance is significantly improved while the video memory overheads are reduced.

It should be noted that, for brief description, the foregoing method example embodiments are expressed as a series of action combinations. However, persons skilled in the art should appreciate that this application is not limited to the described action sequence in order. According to some example embodiments, some steps may be performed in other sequences or performed simultaneously. In addition, persons skilled in the art should also know that all the example embodiments described in this specification are preferred embodiments, and the related actions and modules are not necessarily required in this application.

Through the descriptions of the preceding example embodiments, persons skilled in the art may understand that the methods according to the foregoing example embodiments may be implemented by hardware or by software and an universal hardware platform. However, in most cases, using software and an universal hardware platform is preferred. It may be noted that a piece of the prior art may be implemented as a software product. The computer software product is stored in a storage medium (such as a read-only memory/random access memory (ROM/RAM), a magnetic disk, or an optical disc) and includes several instructions for instructing a terminal device (which may be a mobile phone, a computer, a server, a network device, or the like) to perform the methods described in the example embodiments of this application.

Embodiment 2

According to this exemplary embodiment of this application, an image processing apparatus for implementing the foregoing image processing method is further provided. The image processing apparatus is configured to perform the image processing method provided in the foregoing content in the example embodiments of this application. The following describes the image processing apparatus in this example embodiment of this application.

Figure 7:
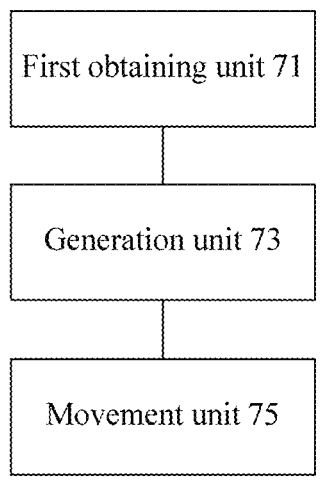
FIG. 7 is a schematic diagram of an image processing apparatus according to the second example embodiment of this application.

FIG. 7 is a schematic diagram of the image processing apparatus according to the second example embodiment of this application. As shown in FIG. 7, the image processing apparatus includes: a first obtaining unit 71, a generation unit 73, and a movement unit 75.

The first obtaining unit 71 is configured to obtain an interaction area in a current image frame in which an interaction space of a first object is intersected with a first plane on which a second object is located, a target object in the second object being located in the interaction area.

The generation unit 73 is configured to generate a base image of a water wave animation corresponding to the interaction area, a plurality of ripples being displayed in the image.

An image of a water wave animation corresponding to a circular section may be generated based on the interaction area (for example, the circular section), and the base image includes a plurality of ripples (that is, water ripples). The generated base image of the water wave animation may be applied to the circular section, and a quantity of water ripples in the generated base image is a quantity of water ripples needing to be displayed by the circular section in the current image frame.

The movement unit 75 is configured to move, by using a first target ripple of the plurality of ripples, the target object to a position that is in the current image frame and that corresponds to a ripple position of the first target ripple in the base image, the first target ripple corresponding to the target object.

In this exemplary embodiment of this application, the image of the water wave animation corresponding to the interaction area is generated when the first object interacts with the second object, and the target object is moved, by using the first target ripple of corresponding to the target object, to the position that is in the current image frame and that corresponds to the ripple position of the first target ripple in the base image, so that an objective of adjusting a position of the target object by using the base image is achieved, implementing a technical effect that a position of the second object may change with the base image of the water wave animation, and resolving a technical problem in an existing technology that a display effect of the second object is relatively poor when the first object interacts with the second object.

Optionally, the movement unit may include an adjustment subunit, configured to adjust the target object from a first modality to a second modality according to the base image of the water wave animation, where a vertex of the target object in the second modality is located at the position that is in the current image frame and that corresponds to the ripple position of the first target ripple in the base image.

Optionally, the adjustment subunit may include: a first obtaining module, configured to obtain value ranges of a first component and a second component of the plurality of ripples in the base image, where the first component is a component in a direction of an X-axis of the base image, and the second component is a component in a direction of a Y-axis of the base image; a second obtaining module, configured to obtain a third component of the target object in a direction of a Z-axis of the base image; a first determining module, configured to: determine, based on the first component and the second component, a first offset distance and a first offset direction of vertex coordinates of the target object on a plane on which the X-axis and the Y-axis are located, and determine a second offset distance and a second offset direction of the target object on the Z-axis according to the third component, where the first offset distance falls within the value range; and a control module, configured to control the vertex coordinates of the target object to be offset by the first offset distance in the first offset direction and to be offset by the second offset distance in the second offset direction.

Optionally, the first obtaining module includes: an obtaining submodule, configured to obtain a maximum value and a minimum value of a ripple at an outermost layer of the plurality of ripples in the base image in the direction of the X-axis, and a maximum value and a minimum value of the ripple at the outermost layer in the direction of the Y-axis; an adjustment submodule, configured to adjust coordinates of each of the plurality of ripples on the X-axis and the Y-axis, so that the maximum value and the minimum value in the direction of the X-axis are preset values, and the maximum value and the minimum value in the direction of the Y-axis are the preset values; and a determining submodule, configured to determine a range indicated by the preset values, as the value range.

Optionally, the generation unit may include: a second determining module, configured to determine, based on a water wave animation height image of an image frame before a first image frame corresponding to the current image frame, a water level of a water wave animation height image of the first image frame, where the first image frame is an image frame of the water wave animation, and the water level is a highest water level among the plurality of ripples in the water wave animation height image of the first image frame; a first generation module, configured to generate a water wave animation height image of the current image frame according to the water level; and a second generation module, configured to generate the base image of the water wave animation according to the water wave animation height image of the current image frame.

Optionally, the first generation module may include a diffusion and attenuation submodule, configured to diffuse a second target ripple by using the second target ripple whose water level is the water level as a center, to obtain a plurality of diffused ripples, where heights of the plurality of diffused ripples gradually decrease from the center to the outside.

The image processing apparatus shown in FIG. 7 may further include an interaction area division unit, and the interaction area division unit is configured to divide, according to distances between interaction areas and a viewpoint, the interaction area into interaction areas of different levels, so that interaction maps corresponding to the interaction areas have different degrees of precision. For example, the interaction area is divided into a close-view interaction area and a remote-view interaction area, and interaction maps corresponding to the close-view interaction area and the remote-view interaction area have different degrees of precision because distances to a viewpoint are different. The close-view interaction area uses a high-precision interaction map, and the remote-view interaction area uses a relatively low-precision interaction map.

The image processing apparatus further includes a first interaction buffer and a second interaction buffer. According to an aspect of this application, updated height data is loaded to the first interaction buffer, where height data corresponding to the interaction areas of different levels is stored on different channels of the first interaction buffer. For example, height data corresponding to the close-view interaction area is stored on red and green channels of the first interaction buffer, and height data corresponding to the remote-view interaction area is stored on blue and Alpha channels of the first interaction buffer.

When the diffusion and attenuation submodule performs a height attenuation and diffusion operation, height data stored on different channels of the first interaction buffer may be separately calculated. For example, the height data stored on the red and green channels and the height data stored in the blue and Alpha channels may be separately calculated.

After normal information is generated according to the height data, the normal information may be loaded to a second interaction buffer different from the first interaction buffer, where normal information corresponding to the interaction areas of different levels is stored on different channels of the second interaction buffer. For example, normal information corresponding to the close-view interaction area is stored on red and green channels of the second interaction buffer, and normal information corresponding to the remote-view interaction area is stored on blue and Alpha channels.

According to an aspect of this application, the apparatus may further include: a height image rendering unit. The height image rendering unit is configured to: output, according to the height data, a height image matching the interaction area of each level, and render the current image frame by using the height image.

According to another aspect of this application, the apparatus may further include: a precision smoothing unit. The precision smoothing unit is configured to perform a smooth transition on degrees of precision between adjacent interaction areas in the interaction areas of different levels according to the degrees of precision of the corresponding interaction images.

Herein, the image of the virtual scenario is formed by using a plurality of interaction maps. Therefore, the image includes a plurality of interaction areas, and each interaction area corresponds to one interaction map. In the image presented in the virtual scenario, the interaction maps have different degrees of precision. Consequently, a smooth transition needs to be performed on degrees of precision between adjacent interaction areas, to overcome disadvantages that the degrees of precision between the interaction areas are uneven, and an edge area in which the interaction areas are intersected with each other have a precision mutation, thereby improving interaction precision. In an exemplary embodiment, the smooth transition between the adjacent interaction areas may be implemented by means of linear interpolation between the adjacent interaction areas.

Embodiment 3

Figure 8:
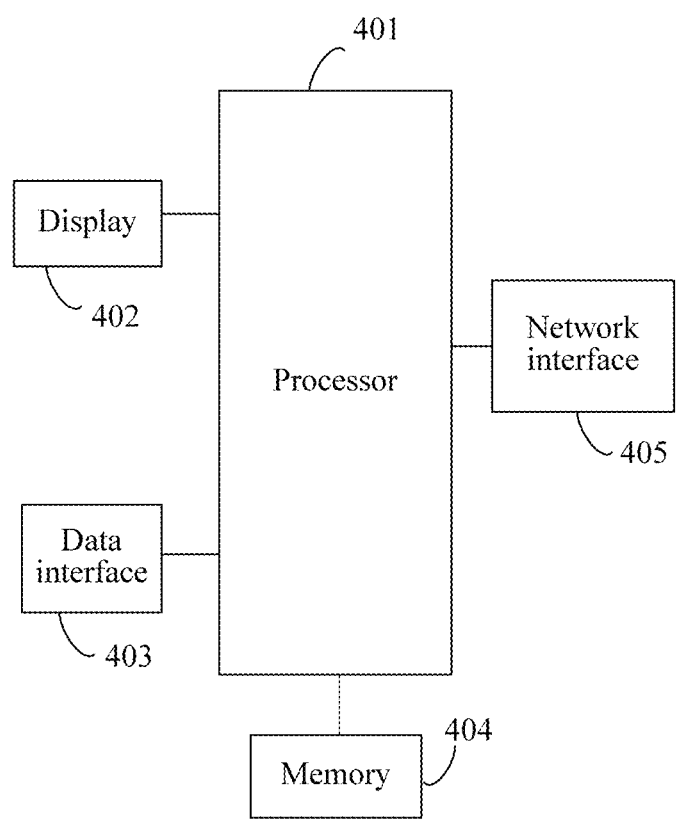
FIG. 8 is a structural diagram of hardware of a terminal according to the third example embodiment of this application.

According to an exemplary embodiment of this application, a terminal, which may be a mobile terminal, for performing the foregoing image processing method is further provided. As shown in FIG. 8, the mobile terminal may include: a processor 401, a display 402, a data interface 403, a memory 404, and a network interface 405.

The display 402 is configured to display an image, for example, a game interface. The game interface may include, but is not limited to a game character or a special effect, and a lawn interacting with the game character or the special effect.

The data interface 403 is configured to transmit, to the processor 401 by means of data transmission, game control instructions entered by a user.

The memory 404 is configured to store instructions and related data for performing the method described in Embodiment 1, for example, an object (for example, the lawn) having a water wave animation effect in a game, and information such as a game process of the user.

The network interface 405 is configured to perform network communication with the processor 401, and provide data for image interaction rendering.

The processor 401 is configured to perform the following operations:

obtaining an interaction area in a current image frame in which an interaction space of a first object is intersected with a first plane on which a second object is located, a target object in the second object being located in the interaction area; generating a base image of a water wave animation corresponding to the interaction area, a plurality of ripples being displayed in the base image; and moving, by using a first target ripple of the plurality of ripples, the target object to a position that is in the current image frame and that corresponds to a ripple position of the first target ripple in the base image, the first target ripple corresponding to the target object.

The processor 401 is further configured to adjust the target object from a first modality to a second modality according to the base image of the water wave animation, where a vertex of the target object in the second modality is located at the position that is in the current image frame and that corresponds to the ripple position of the first target ripple in the base image.

The processor 401 is further configured to: obtain value ranges of a first component and a second component of the plurality of ripples in the base image, where the first component is a component in a direction of an X-axis of the base image, and the second component is a component in a direction of a Y-axis of the base image; obtain a third component of the target object in a direction of a Z-axis of the base image; determine, according to the first component and the second component, a first offset distance and a first offset direction of vertex coordinates of the target object on a plane on which the X-axis and the Y-axis are located, and determine a second offset distance and a second offset direction of the target object on the Z-axis according to the third component, where the first offset distance falls within the value range; and control the vertex coordinates of the target object to be offset by the first offset distance in the first offset direction and to be offset by the second offset distance in the second offset direction.

The processor 401 is further configured to: obtain a maximum value and a minimum value of a ripple at an outermost layer of the plurality of ripples in the base image in the direction of the X-axis, and a maximum value and a minimum value of the ripple at the outermost layer in the direction of the Y-axis; adjust coordinates of each of the plurality of ripples on the X-axis and the Y-axis, so that the maximum value and the minimum value in the direction of the X-axis are preset values, and the maximum value and the minimum value in the direction of the Y-axis are the preset values; and determine a range indicated by the preset values, as the value range.

The processor 401 is further configured to: determine, based on a water wave animation height image of an image frame before a first image frame corresponding to the current image frame, a water level of a water wave animation height image of the first image frame, where the first image frame is an image frame of the water wave animation, and the water level is a highest water level among the plurality of ripples in the water wave animation height image of the first image frame; generate a water wave animation height image of the current image frame based on the water level; and generate the base image of the water wave animation based on the water wave animation height image of the current image frame.

The processor 401 is further configured to diffuse a second target ripple by using the second target ripple whose water level is the water level as a center, to obtain a plurality of diffused ripples, where heights of the plurality of diffused ripples gradually decrease from the center to the outside.

The processor 401 is further configured to divide, according to distances between interaction areas and a viewpoint, the interaction area into interaction areas of different levels, so that interaction images corresponding to the interaction areas have different degrees of precision.

The memory 404 further includes a first interaction buffer and a second interaction buffer. The processor 401 may further load updated height data to the first interaction buffer, where height data corresponding to the interaction areas of different levels is stored on different channels of the first interaction buffer. When the processor 401 performs a height attenuation and diffusion operation, height data stored on different channels of the first interaction buffer may be separately calculated.

After the processor 401 generates normal information according to the height data, the processor 401 may further load the normal information to the second interaction buffer, where normal information corresponding to the interaction areas of different levels is stored on different channels of the second interaction buffer.

The processor 401 may further output, according to the height data, a height image matching the interaction area of each level, and render the current image frame by using the height image.

The processor 401 may further perform a smooth transition on degrees of precision between adjacent interaction areas in the interaction areas of different levels according to the degrees of precision of the corresponding interaction images.

Embodiment 4

This exemplary embodiment of this application further provides a non-transitory computer-readable storage medium. Optionally, in this exemplary embodiment, the storage medium may be configured to store program code for performing the image processing method in Embodiment 1 of this application.

Optionally, in this exemplary embodiment, the non-transitory computer-readable storage medium may be located in at least one network device of a plurality of network devices in networks such as a mobile communications network, a wide area network, a metropolitan area network, or a local area network.

Optionally, in this exemplary embodiment, the storage medium is configured to store program code for performing the following steps:

Obtain an interaction area in a current image frame in which an interaction space of a first object is intersected with a first plane on which a second object is located, a target object in the second object being located in the interaction area.

Generate a base image of a water wave animation corresponding to the interaction area, a plurality of ripples being displayed in the base image.

Move, by using a first target ripple of the plurality of ripples, the target object to a position that is in the current image frame and that corresponds to a ripple position of the first target ripple in the base image, the first target ripple corresponding to the target object.

Optionally, in this exemplary embodiment, the foregoing storage medium may include, but is not limited to: any medium that can store program code, such as a USB flash drive, a ROM, a RAM, a removable hard disk, a magnetic disk, or an optical disc.

Optionally, in an exemplary embodiment, the details not described herein may refer to the details discussed in Embodiment 1 and/or Embodiment 2.

It may be noted that the sequence numbers in the preceding example embodiments are for description purpose, but do not indicate the preference of the example embodiments.

When the integrated unit in the foregoing example embodiment is implemented in a form of a software functional module and sold or used as an independent product, the integrated unit may be stored in the foregoing the non-transitory computer-readable storage medium. Based on such an understanding, the technical solutions of this application essentially, or the part contributing to the prior art, or all or some of the technical solutions may be implemented in a form of a software product. The computer software product is stored in a storage medium and includes several instructions for instructing one or more computer devices (which may be a personal computer, a server, a network device, or the like) to perform all or some of the steps of the methods described in the example embodiments of this application.

In the foregoing example embodiments of this application, descriptions of the example embodiments have different emphases, and as for parts that are not described in detail in one embodiment, reference can be made to the relevant description of the other example embodiments.

In the example embodiments provided in this application, it may be noted that the apparatus may be implemented in other manners. For example, the unit division is logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the units or modules may be implemented in electronic or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the example embodiments.

In addition, functional units in the example embodiments of this application may be integrated into one processing unit, or each of the units may exist alone physically, or two or more units are integrated into one unit. The integrated unit may be implemented in a form of hardware, or may be implemented in a form of a software functional unit.

The above descriptions are merely preferred embodiments of this application, and it should be noted that, persons of ordinary skill in the art may make various improvements and refinements without departing from the spirit of this application. All such modifications and refinements are also intended to be covered by this application.

In addition, aspects of one disclosed example embodiment may be used with aspects of other disclosed example embodiments without departing from the spirit of this disclosure.

What is claimed is:

1. An image processing method, comprising:
obtaining, by at least one processor, an interaction area in a current image frame that includes a first virtual object and a second virtual object, the interaction area being an area in which an interaction space of the first virtual object is intersected with a first plane on which the second virtual object is located, a target object in the second virtual object being located in the interaction area;

generating, by the at least one processor, a base image of a water wave animation corresponding to the interaction area, a plurality of ripples being provided in the base image; and moving, by the at least one processor by using a first target ripple of the plurality of ripples, the target object to a position that is in the current image frame and that corresponds to a ripple position of the first target ripple in the base image.

2. The method according to claim 1, wherein the moving, by using a first target ripple of the plurality of ripples, the target object to a position that is in the current image frame and that corresponds to a ripple position of the first target ripple in the base image comprises:

adjusting the target object from a first modality to a second modality based on the base image of the water wave animation, wherein a vertex of the target object in the second modality is located at the position that is in the current image frame and that corresponds to the ripple position of the first target ripple in the base image.

3. The method according to claim 2, wherein the adjusting the target object from a first modality to a second modality according to the base image of the water wave animation comprises:

obtaining value ranges of a first component and a second component of the plurality of ripples in the base image, wherein the first component is a component in a direction of an X-axis of the base image, and the second component is a component in a direction of a Y-axis of the base image;

obtaining a third component of the target object in a direction of a Z-axis of the base image;

determining, based on the first component and the second component, a first offset distance and a first offset direction of vertex coordinates of the target object on a plane on which the X-axis and the Y-axis are located, and determining a second offset distance and a second offset direction of the target object on the Z-axis based on the third component, wherein the first offset distance falls within the value range; and controlling the vertex coordinates of the target object to be offset by the first offset distance in the first offset direction and to be offset by the second offset distance in the second offset direction.

4. The method according to claim 3, wherein the obtaining value ranges of a first component and the second component of the plurality of ripples in the base image:

obtaining a maximum value and a minimum value of a ripple at an outermost layer of the plurality of ripples in the base image in the direction of the X-axis, and a maximum value and a minimum value of the ripple at the outermost layer in the direction of the Y-axis;

adjusting coordinates of each of the plurality of ripples on the X-axis and the Y-axis, so that the maximum value and the minimum value in the direction of the X-axis are preset values, and the maximum value and the minimum value in the direction of the Y-axis are the preset values; and determining a range indicated by the preset values, as the value range.

5. The method according to claim 1, wherein the generating a base image of a water wave animation corresponding to the interaction area comprises:

determining, based on a water wave animation height image of an image frame before a first image frame corresponding to the current image frame, a water level of a water wave animation height image of the first image frame, wherein the first image frame is an image frame of the water wave animation, and the water level is a highest water level among the plurality of ripples in the water wave animation height image of the first image frame;

generating a water wave animation height image of the current image frame according to the water level; and generating the base image of the water wave animation according to the water wave animation height image of the current image frame.

6. The method according to claim 5, wherein the generating a water wave animation height image of the current image frame according to the water level comprises:

diffusing a second target ripple by using the second target ripple whose water level is the water level as a center, to obtain a plurality of diffused ripples, wherein heights of the plurality of diffused ripples gradually decrease from the center to the outside.

7. The method according to claim 6, wherein the method further comprises:

dividing, based on distances between interaction areas and a viewpoint, the interaction area into interaction areas of different levels, so that interaction images corresponding to the interaction areas of different levels have different degrees of precision.

8. The method according to claim 7, wherein the method further comprises: loading, to a first buffer, height data carried in the water wave animation height image, wherein height data corresponding to the interaction areas of different levels is stored on different channels of the first buffer.

9. The method according to claim 8, wherein in a process in which the second target ripple is diffuse to obtain the plurality of diffused ripples, the height data stored on the different channels of the first buffer are separately calculated.

10. The method according to claim 8, further comprising:

loading information for forming the base image to a second buffer, wherein the information corresponding to the interaction areas of different levels is stored on different channels of the second buffer.

11. The method according to claim 8, further comprising:

outputting, based on the height data, a height image matching the interaction area of each level, and rendering the current image frame by using the height image.

12. The method according to claim 7, wherein a smooth transition is performed on degrees of precision between adjacent interaction areas in the interaction areas of different levels according to the degrees of precision of the corresponding interaction images.

13. An image processing apparatus, comprising:

at least one memory configured to store computer program code;

at least one processor configured to access said memory and operate according to said computer program code, said computer program code including:

obtaining code configured to cause at least one of said at least one processor to obtain an interaction area in a current image frame that includes a first virtual object and a second virtual object, the interaction area being an area in which an interaction space of the first virtual object is intersected with a first plane on which the second virtual object is located, a target object in the second virtual object being located in the interaction area;

generation code configured to cause at least one of said at least one processor to generate a base image of a water wave animation corresponding to the interaction area, a plurality of ripples being provided in the base image; and movement code configured to cause at least one of said at least one processor to move, by using a first target ripple of the plurality of ripples, the target object to a position that is in the current image frame and that corresponds to a ripple position of the first target ripple in the base image.

14. The apparatus according to claim 13, further comprising:

adjustment code configured to cause at least one of said at least one processor to adjust the target object from a first modality to a second modality according to the base image of the water wave animation, wherein a vertex of the target object in the second modality is located at the position that is in the current image frame and that corresponds to the ripple position of the first target ripple in the base image.

15. The apparatus according to claim 14, wherein:

said obtaining code is further configured to cause at least one of said at least one processor to obtain value ranges of a first component and a second component of the plurality of ripples in the base image, wherein the first component is a component in a direction of an X-axis of the base image, and the second component is a component in a direction of a Y-axis of the base image and to obtain a third component of the target object in a direction of a Z-axis of the base image; and said computer program code further comprises:

determining code configured to cause at least one of said at least one processor to determine, based on the first component and the second component, a first offset distance and a first offset direction of vertex coordinates of the target object on a plane on which the X-axis and the Y-axis are located, and determine a second offset distance and a second offset direction of the target object on the Z-axis according to the third component, wherein the first offset distance falls within the value range; and control code configured to cause at least one of said at least one processor to control the vertex coordinates of the target object to be offset by the first offset distance in the first offset direction and to be offset by the second offset distance in the second offset direction.

16. The apparatus according to claim 15, wherein:

said obtaining code is further configured to cause at least one of said at least one processor to obtain a maximum value and a minimum value of a ripple at an outermost layer of the plurality of ripples in the base image in the direction of the X-axis, and a maximum value and a minimum value of the ripple at the outermost layer in the direction of the Y-axis;

said adjustment code is further configured to cause at least one of said at least one processor to adjust coordinates of each of the plurality of ripples on the X-axis and the Y-axis, so that the maximum value and the minimum value in the direction of the X-axis are preset values, and the maximum value and the minimum value in the direction of the Y-axis are the preset values; and said determining code is further configured to cause at least one of said at least one processor to determine a range indicated by the preset values, as the value range.

17. The apparatus according to claim 13, further comprising:

determining code configured to cause at least one of said at least one processor to determine, based on a water wave animation height image of an image frame before a first image frame corresponding to the current image frame, a water level of a water wave animation height image of the first image frame, wherein the first image frame is an image frame of the water wave animation, and the water level is a highest water level among the plurality of ripples in the water wave animation height image of the first image frame;

wherein said generation code is further configured to cause at least one of said at least one processor to generate a water wave animation height image of the current image frame according to the water level, and to generate the base image of the water wave animation according to the water wave animation height image of the current image frame.

18. The apparatus according to claim 17, further comprising:

diffusion and attenuation code configured to cause at least one of said at least one processor to diffuse a second target ripple by using the second target ripple whose water level is the water level as a center, to obtain a plurality of diffused ripples, wherein heights of the plurality of diffused ripples gradually decrease from the center to the outside.

19. The apparatus according to claim 18, further comprising:

interaction area division code configured to cause at least one of said at least one processor to divide, based on distances between interaction areas and a viewpoint, the interaction area into interaction areas of different levels, so that interaction images corresponding to the interaction areas of different levels have different degrees of precision.

20. A non-transitory computer-readable storage medium, the computer-readable storage medium storing program code that causes at least one computer processor to perform:

obtaining an interaction area in a current image frame that includes a first virtual object and a second virtual object, the interaction area being an area in which an interaction space of the first virtual object is intersected with a first plane on which the second virtual object is located, a target object in the second virtual object being located in the interaction area;

generating a base image of a water wave animation corresponding to the interaction area, a plurality of ripples being provided in the base image; and moving, by using a first target ripple of the plurality of ripples, the target object to a position that is in the current image frame and that corresponds to a ripple position of the first target ripple in the base image.

* * * * *